United States Patent
Holcomb et al.

(10) Patent No.: US 8,104,810 B2
(45) Date of Patent: Jan. 31, 2012

(54) GRIPPER HAVING SENSOR FOR DETECTING DISPLACEMENT

(75) Inventors: Mark Holcomb, Tecumseh, MI (US);
Conrad Waldorf, Pinckney, MI (US);
John Charlton, Tecumseh, MI (US)

(73) Assignee: Norgren Automotive Solutions, Inc., Clinton Township, MI (US)

( * ) Notice: Subject to any disclaimer, the term of this patent is extended or adjusted under 35 U.S.C. 154(b) by 432 days.

(21) Appl. No.: 11/933,521

(22) Filed: Nov. 1, 2007

(65) Prior Publication Data

US 2008/0101895 A1 May 1, 2008

Related U.S. Application Data

(60) Provisional application No. 60/855,920, filed on Nov. 1, 2006.

(51) Int. Cl.
*B25J 13/08* (2006.01)
(52) U.S. Cl. .......... 294/192; 294/203; 294/907; 901/35; 901/46; 324/207.15
(58) Field of Classification Search .......... 294/88, 294/115, 116, 907; 901/32, 35, 37, 46; 269/32, 269/34; 324/207.15, 207.16, 207.17, 207.18, 324/207.19, 207.24
See application file for complete search history.

(56) References Cited

U.S. PATENT DOCUMENTS

| | | | | |
|---|---|---|---|---|
| 4,682,805 A | * | 7/1987 | Reynolds | 294/86.4 |
| 4,723,503 A | * | 2/1988 | Yuda | 116/204 |
| 5,090,757 A | * | 2/1992 | Huber et al. | 294/88 |
| 5,383,697 A | * | 1/1995 | Roudaut | 294/88 |
| 6,605,939 B1 | | 8/2003 | Jansseune et al. | |
| 6,641,189 B2 | * | 11/2003 | Moilanen et al. | 294/88 |
| 6,714,004 B2 | * | 3/2004 | Jagiella | 324/207.16 |
| 2003/0151402 A1 | * | 8/2003 | Kindler | 324/207.17 |
| 2005/0253576 A1 | | 11/2005 | Nyce | |
| 2006/0238189 A1 | | 10/2006 | Holcomb et al. | |

FOREIGN PATENT DOCUMENTS

SU 1743857 6/1992

OTHER PUBLICATIONS

Database WPI, Week 199327, Thomson Scientific, 1993-217931, XP002473315, London, GB.
International Search Report and Written Opinion dated Apr. 3, 2008.
International Preliminary Report on Patentability dated Oct. 15, 2008.

* cited by examiner

*Primary Examiner* — Dean Kramer
(74) *Attorney, Agent, or Firm* — Young Basile Hanlon & MacFarlane P.C.

(57) ABSTRACT

A gripper assembly includes at least one movable gripper jaw and a sensor member coupled for movement with the at least one gripper jaw. The sensor member includes a slot. A sensor is located at least partially within the slot and includes at least one inductor for inductively detecting a proximity of the sensor member.

11 Claims, 3 Drawing Sheets

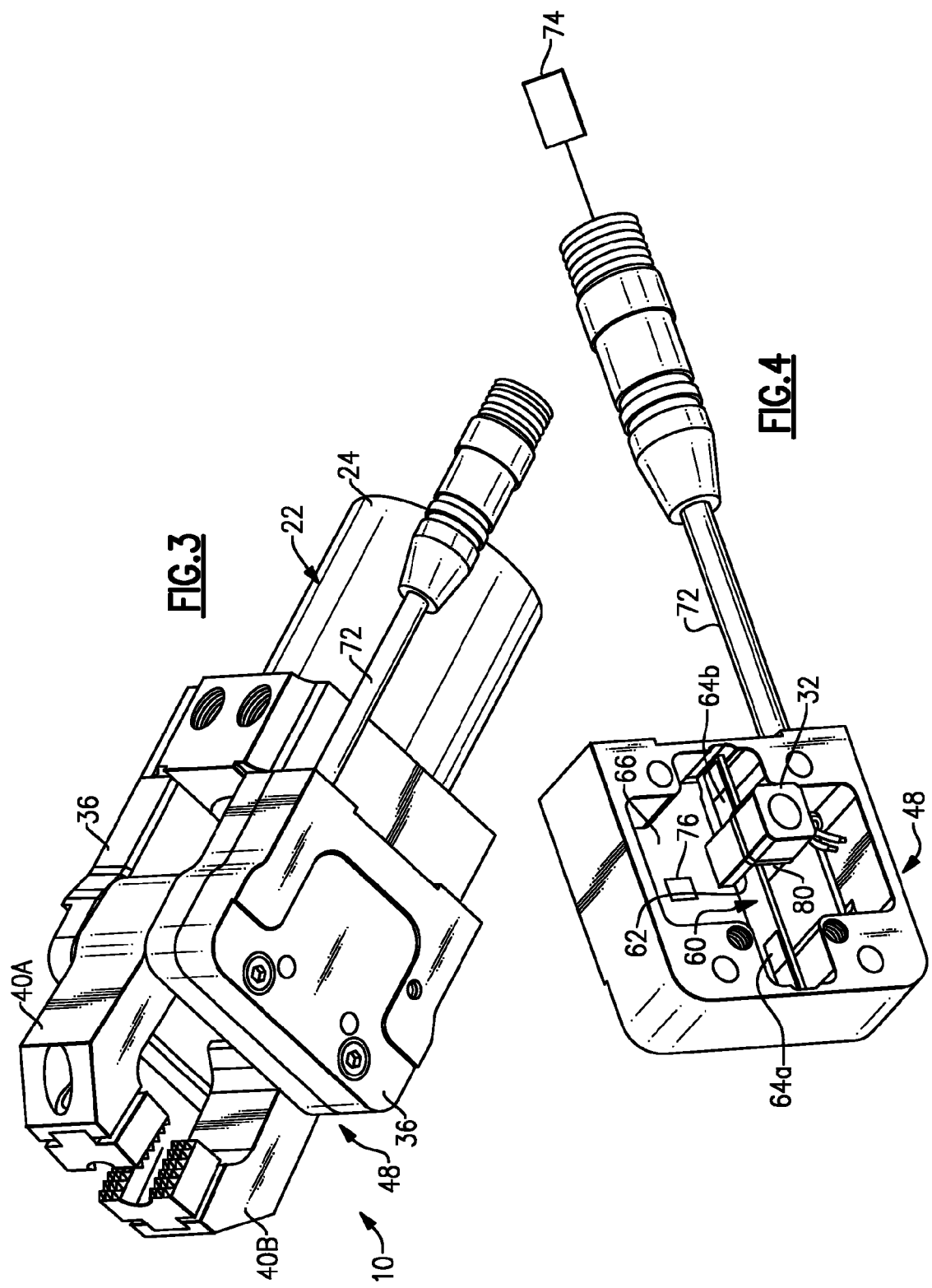

GRIPPER HAVING SENSOR FOR DETECTING DISPLACEMENT

RELATED APPLICATIONS

The application claims priority to U.S. Provisional Application No. 60/855,920, which was filed on Nov. 1, 2006.

BACKGROUND OF THE INVENTION

This invention relates generally to automated handling equipment and, more particularly, to a gripper system and method for detecting displacement of a gripper jaw using an inductor.

Automated handling equipment is typically employed in industrial settings for transferring work pieces between work stations. Typically, the equipment includes a gripper that clamps onto work pieces while moving the work pieces between the stations. Conventional grippers include an actuator that moves one or more gripper jaws between open and closed jaw positions.

Sensors, such as mechanical proximity sensors or displacement sensors, have been employed within gripper assemblies to detect jaw position or a displacement between gripper jaws. Typically, the accuracy of a mechanical proximity sensor or a displacement sensor is sensitive to the positioning of the sensor relative to the moving parts of the gripper. As a result, setup and use of the sensor can be complex and require many adjustments. Furthermore, for gripper jaws or other types of applications there is often a significant amount of play between the moving parts, which undesirably compromises the accuracy of the sensed position.

SUMMARY OF THE INVENTION

The disclosed example gripper assemblies and methods are for providing a relatively simple sensor assembly and for facilitating improved accuracy of gripper jaw position determination.

One example gripper assembly includes at least one movable gripper jaw and a sensor member coupled for movement with the at least one movable gripper jaw. The sensor member includes a slot. A sensor is located at least partially within the slot and includes at least one inductor for inductively detecting a proximity of the sensor member.

In one example, the gripper assembly includes a fluid-driven actuator, a pair of side walls connected to the fluid driven actuator that each have a groove therein, and a rod extending between the side walls for actuation by the fluid-driven actuator. A pair of cam pins extends from the rod into respective ones of the grooves of the side walls. A pair of gripper jaws each has a cam slot, and the cam pins extend through respective ones of the cam slots. Actuation of the rod causes the cam pins to move along the cam slots and thereby move the gripper jaws. In one example, the sensor member is coupled for movement with one of the cam pins.

An example method of determining displacement of at least one gripper jaw of a gripper assembly includes the steps of influencing an electric current flowing through at least one inductor in response to movement of the at least one gripper jaw and determining a magnitude of displacement of the at least one gripper jaw based on a change in the electric current flowing through the at least one inductor.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 3 shows a perspective view of the example gripper assembly.

FIG. 4 shows a perspective view of an example sensor assembly for use with the example gripper assembly.

DETAILED DESCRIPTION OF THE REFERRED EMBODIMENT

Figure 1:
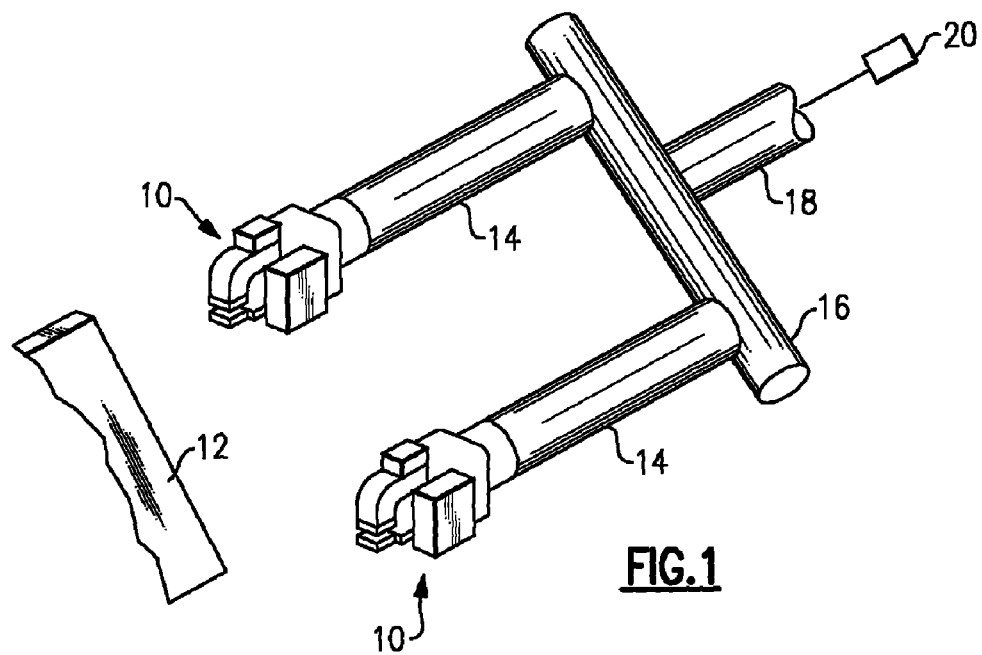
FIG. 1 shows a perspective view of an example gripper assembly in an industrial setting.

FIG. 1 illustrates selected portions of several automated gripper assemblies 10 used in an example industrial setting to grip and move a work piece 12 (shown schematically). The gripper assemblies 10 may be used in a variety of different configurations from that shown. In this example, the gripper assemblies 10 are coupled to extended arms 14, which are each secured to a rail 16. An adapter arm 18 is secured to the rail 16. An automated machine 20, such as a robot, moves the adapter arm 18, the extended arms 14, and the gripper assemblies 10 to desired positions to retrieve and deposit the work pieces 12, such as between work stations.

Figure 2:
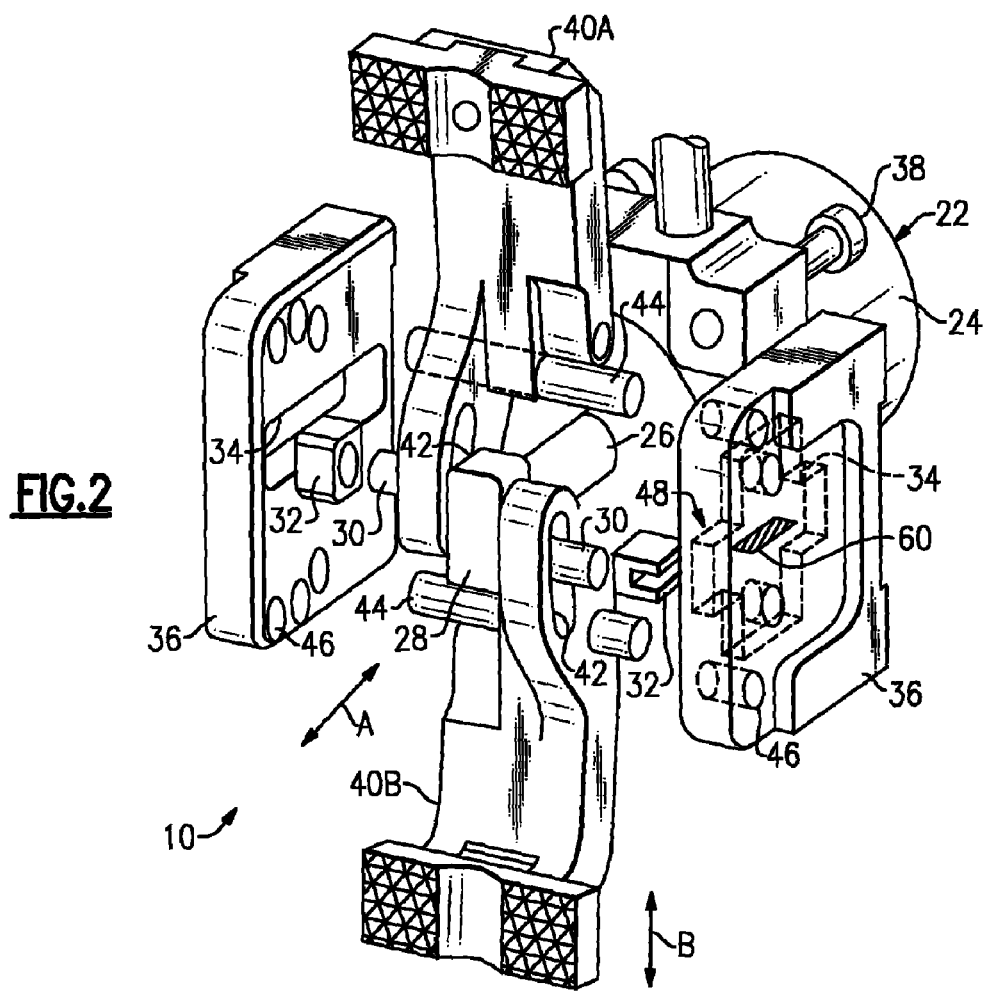
FIG. 2 shows an exploded view of an example gripper assembly.

FIG. 2 illustrates selected portions of one of the gripper assemblies 10 shown in FIG. 1. Although FIG. 2 illustrates a particular gripper configuration, the examples disclosed herein may also be applied by workers in the art to other gripper configurations.

In the disclosed example, the gripper assembly 10 includes an actuator 22 having an actuator cylinder 24 for hydraulically or pneumatically moving a rod 26 along axis A. A coupling 28 mounted near the end of the rod 26 supports cam pins 30. In the illustrated example, the cam pins 30 are axially offset from one another, however, in other examples, the cam pins 30 may be axially aligned. Bushings 32 are received onto respective ends of the cam pins 30. The bushings 32 may be coupled to the cam pins 30 in any suitable way, to allow some degree of movement or to rigidly attach the bushings, for example. The bushings 32 may also be integrally formed with the coupling 28. Each of the bushings 32 is received within a groove 34 of respective spaced apart side walls 36. The side walls 36 are secured to the actuator 22 using fasteners 38, for example. As will be described below, at least one of the bushings 32 functions as a sensor member for detecting jaw displacement.

Gripper jaws 40a and 40b are coupled for movement with the rod 26. In the illustrated example, each of the gripper jaws 40a and 40b includes a cam slot 42 through which the respective cam pins 30 extend. A pivot pin 44 extends from each gripper jaw 40a and 40b into respective openings 46 in the side walls 36.

Operationally, the actuator 22 (e.g., a fluid-driven actuator) selectively extends or retracts the rod 26. The rod 26, being coupled to the cam pins 30, moves the cam pins 30 along the cam slots 42 of the respective gripper jaws 40a and 40b. Movement of the cam pins 30 causes the gripper jaws 40a and 40b to pivot about the respective pivot pins 44 to selectively open or close the jaws 40a and 40b. As the cam pins 30 move through the cam slots 42, the bushings 32 move along the grooves 34 and linearly guide movement of the rod 26.

The gripper assembly 10 also includes an inductor sensor assembly 48 for detecting movement or displacement of the gripper jaws 40a and 40b. For example, the inductor sensor assembly 48 determines a distance between the gripper jaws 40a and 40b, as described below.

Referring to FIGS. 3-6, the example inductor sensor assembly 48 includes one of the bushings 32 and a circuit board 60 (i.e., a sensor). In the illustrated example, the bushing 32 includes a slot 62 that straddles the circuit board 60. The circuit board 60 includes a pair of spaced apart inductor coils 64a and 64b and is connected to a main circuit board 66. In this example, the circuit board 60 and the main circuit board 66 are electrically connected.

In the illustrated example, the circuit board 60 is mechanically connected to the main circuit board 66. The circuit board 60 includes tabs 68 that are received at least partially through slots 70 within the main circuit board 66 to secure the circuit board 60 and the main circuit board 66 together. Alternatively, the circuit board 60 and the main circuit board 66 may be secured together using other mechanical features, such as fasteners.

In this example, the circuit board section 60, the main circuit board section 66, or both, are connected through a communication line 72 with a controller 74 that may be used to display jaw position data, program the inductor sensor assembly 48 or provide other functions.

In operation, the bushing 32 moves along the circuit board 60 as the rod 26 extends and retracts to actuate the jaws 40a and 40b. The actual distance along the circuit board 60 that the bushing 32 moves depends on the extension and retraction stroke of the rod 26. For example, for relatively short strokes, the bushing 32 moves from the left end of the inductor coil 64a (FIG. 5) to the right end of the inductor coil 64a and does not move over the other inductor coil 64b at all. For relatively longer strokes, the bushing 32 may also move over the other inductor coil 64b.

Figure 6:
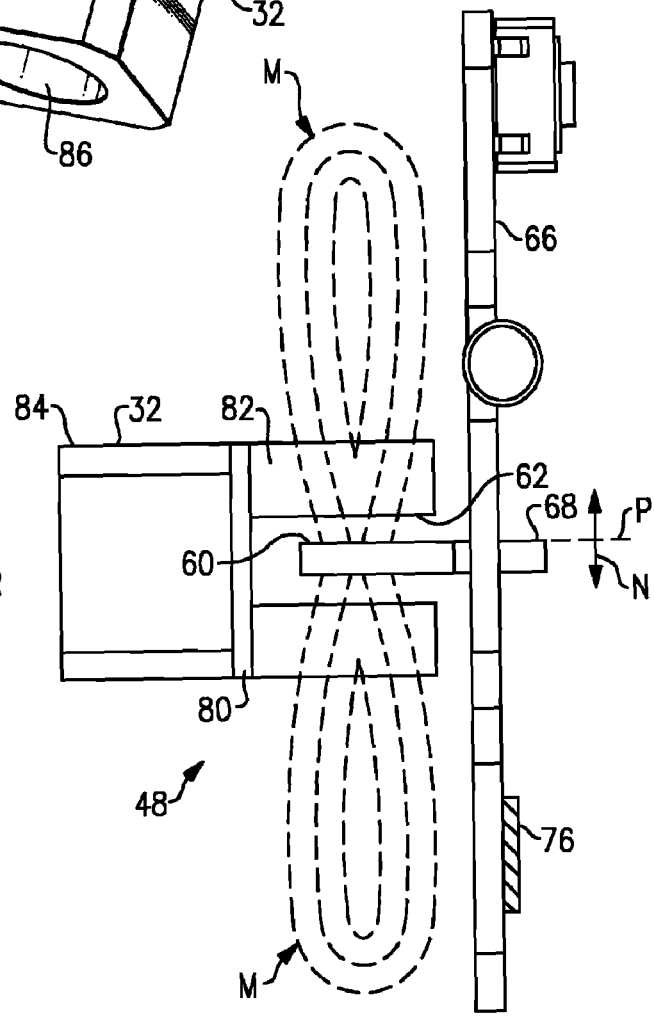
FIG. 6 shows a view of the bushing straddling the circuit board section.

An electric current flows through each of the inductor coils 64a and 64b to produce associated magnetic fields, M (FIG. 6). The bushing 32 interacts with one or both of the magnetic fields M, depending on the size of the stroke of the rod 26. The inductor sensor assembly 48 detects the interaction between the bushing 32 and the magnetic fields M and determines the position of the gripper jaws 40a and 40b based upon the detected interaction.

The interaction between the magnetic fields M and the bushing 32 induces eddy currents within the bushing 32. The eddy currents produce another magnetic field that opposes the magnetic fields M of one or both of the inductor coils 64a and 64b, depending on the proximity of the bushing 32 to the inductor coils 64a and 64b. That is, a closer proximity produces greater opposition. The opposition to the magnetic fields M causes change in the electric current through the inductor coils 64a and 64b. A device 76, such as a processing unit, mounted on the main circuit board 66 detects the change in the electric current and determines the linear position of the bushing 32 along the circuit board section 60. For example, the device 76 is programmed with calibration information relating magnitudes of changes in the electric current to linear positions of the bushing 32. Alternatively, the device 76 may be mounted on the circuit board 60, on the controller 74, or remotely from the circuit board 60 and main circuit board 66.

As can be appreciated, the linear position of the bushing 32 corresponds to a distance between the gripper jaws 40a and 40b. Thus, the distance between the gripper jaws 40a and 40b is determined from the change in the electric current. As can also be appreciated, the distance between the gripper jaws 40a and 40b can be used for a variety of different purposes, such as to determine how many work pieces 12 of a known thickness are between the gripper jaws.

The disclosed example provides the benefit of improved tolerance to play between moving parts of the gripper assembly 10. In prior sensor assemblies, play between moving parts translates into relative movement between sensing elements within the sensor assembly that compromises the accuracy of the sensed position. However, the inductor sensor assembly 48 of the disclosed examples utilizes the bushing 32 having a slot 62 that straddles the circuit board 60. The slot 62 straddling the circuit board section 60 reduces variation in the sensed position due to relative movement of the bushing 32 along a B direction (FIG. 2). For example, relative movement along the direction B might move one side of the slot 62 away from the circuit board section 60. However, such movement would necessarily move the other side of the slot 62 closer to the circuit board section 60. Thus, the interaction between the bushing 32 and the magnetic fields M reduces variations in the sensed position due to movement in the B direction compared to a bushing that is on only one side of an inductor coil. This provides the benefit of relatively greater tolerance to play that might occur along the B direction.

In the illustrated example, the bushing 32 (at least the one having the slot 62) is made of a non-ferromagnetic material such as brass, aluminum, copper, or other known non-ferromagnetic materials. Non-ferromagnetic materials have a relatively low magnetic permeability to thereby resist magnetic dipole orientation in the presence of the magnetic fields M. This provides the benefit of reducing residual magnetism within the bushing 32 that could otherwise affect the interaction with the magnetic fields M of the inductor coils 64a and 64b to thereby compromise the accuracy of the sensed position. Likewise, in the disclosed example, the materials used to make the other components of the gripper assembly 10 are made of non-ferromagnetic materials. Given this description, one of ordinary skill in the art will be able to determine whether components that are made of ferromagnetic material significantly affect the accuracy for their particular application.

Additionally, the inductor coils 64a and 64b of the circuit board 60 in the illustrated example are oriented relative to the gripper jaws 40a and 40b to reduce any inductive interference from the gripper jaws 40a and 40b on the magnetic fields M. For example, the inductor coils 64a and 64b are formed in a plane P having a normal direction N. The magnetic fields M extend primarily in the normal direction (also the B direction) as shown schematically in FIG. 6, which is about parallel to a linear direction of movement associated with the gripper jaws 40a and 40b. That is, even though the gripper jaws 40a and 40b may actually move over an arced path, the gripper jaws 40a and 40b generally move upwards/downwards (relative to FIG. 2) to open and close. Thus, the parallel relationship facilitates reduction of inductive interference on the magnetic fields M from interaction with the gripper jaws 40a and 40b (e.g., from eddy currents). Although the circuit board 60 can be oriented other than as shown, different orientations may direct the magnetic fields M such that they interact with the gripper jaws 40a and 40b, in which case eddy currents from the gripper jaws 40a and 40b may compromise the accuracy of the sensed position much the same as the eddy currents generated within the bushing 32 are used to sense position.

Figure 5:
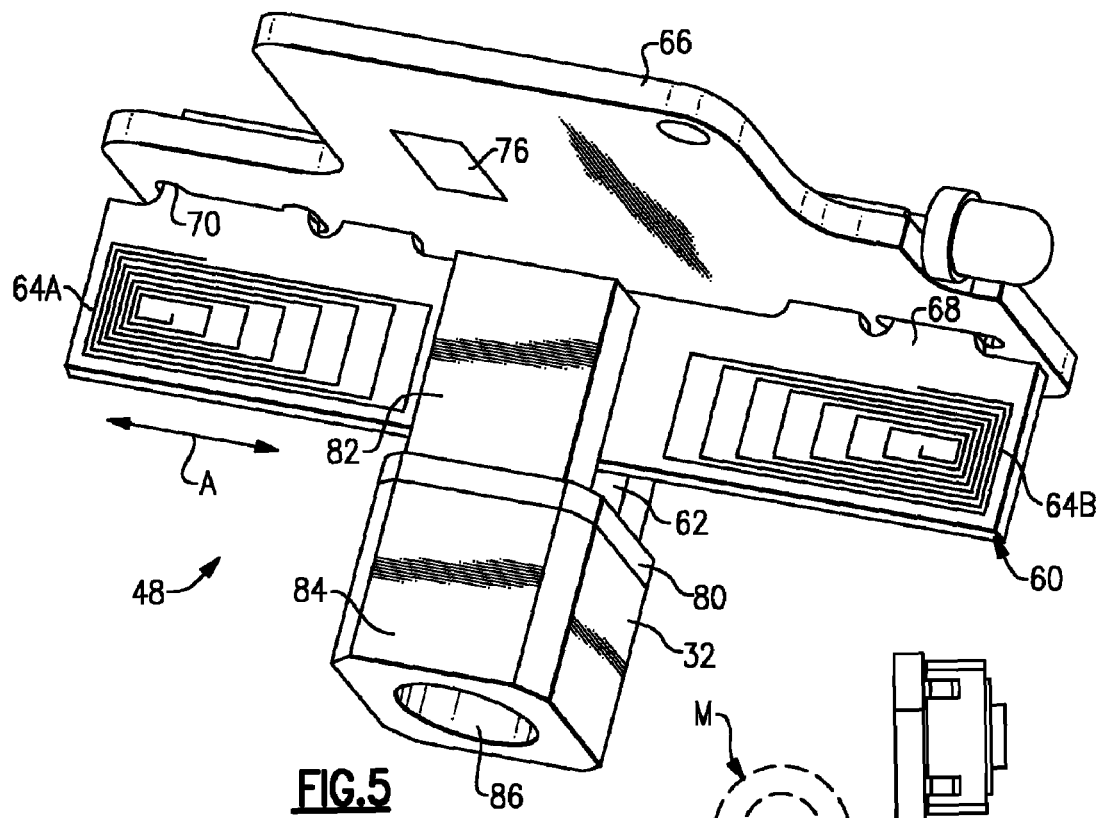
FIG. 5 shows a perspective view of a bushing and circuit board section of the example sensor assembly.

Optionally, as also shown in FIGS. 4-6, the bushing 32 may include a gasket 80 between a portion 82 of the bushing 32 that forms the slot 62 and a remaining portion 84 (e.g., a base portion) of the bushing 32 that includes an opening 86 for attaching the bushing 32 to the cam pin 30. The gasket 80 is made of a known electrically insulating material, such as an elastomer, a plastic, a ceramic, or a non-conductive polymer composite, to prevent the eddy currents from conducting from the portion 82 to the portion 84 of the bushing 32. This provides the benefit of isolating the slot 62 for interaction with the magnetic fields M without interference from eddy currents in the portion 84.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A gripper assembly comprising:
   at least one moveable gripper jaw;
   a sensor member coupled for movement with the at least one moveable gripper jaw; and
   a fixedly positioned sensor having at least one inductor coil for inductively detecting a proximity of the sensor member, wherein the sensor comprises a first circuit board and a second circuit board mechanically coupled with the first circuit board, wherein the first circuit board of the sensor is oriented at a non-parallel angle with respect to the second circuit board of the sensor.

2. The gripper assembly as recited in claim 1, wherein the first circuit board of the sensor is substantially perpendicular to the second circuit board of the sensor.

3. The gripper assembly as recited in claim 1, wherein a plane defined by the first circuit board of the sensor intersects a plane defined by the second circuit board of the sensor.

4. A gripper assembly comprising:
   at least one moveable gripper jaw;
   a sensor member having a first portion and a second portion that is coupled for movement with the at least one moveable gripper jaw, the sensor member including a gasket between the first portion and the second portion to electrically isolate the second portion from the first portion; and
   a fixedly positioned sensor having at least one inductor coil for inductively detecting a proximity of the first portion of the sensor member.

5. The gripper assembly as recited in claim 4, wherein the gasket comprises at least one of an elastomer, a plastic, a ceramic, or a polymer composite.

6. The gripper assembly as recited in claim 4, wherein the second portion includes an opening for attachment of the sensor member.

7. A method of determining displacement of at least one gripper jaw of a gripper assembly, comprising:
   influencing an electric current flowing through at least one inductor in response to movement of at least one gripper jaw;
   determining a displacement of the at least one gripper jaw based on a change in the electric current flowing through the at least one inductor coil; and
   providing a gasket to electrically isolate at least a portion of a sensor member used to influence the electric current to reduce the inductive interference from the sensor member.

8. The method as recited in claim 7, further comprising actuating a fluid-driven actuator to thereby move a sensor member that is coupled with a rod extending from the fluid-driven actuator to influence the electric current.

9. The method as recited in claim 7, further comprising orienting a normal direction of a plane formed by an inductive coil of the at least one inductor about parallel to a linear direction of movement associated with the at least one gripper jaw to reduce the inductive interference from the at least one gripper jaw.

10. A gripper assembly comprising:
    at least one moveable gripper jaw;
    a sensor member coupled for movement with the at least one moveable gripper jaw; and
    a fixedly positioned sensor having at least one inductor coil for inductively detecting a proximity of the sensor member, wherein the sensor comprises a first circuit board and a second circuit board mechanically coupled with the first circuit board, wherein the first circuit board of the sensor is disposed outward from the sensor member and the second circuit board of the sensor extends inward toward the sensor member from the first circuit board of the sensor.

11. A gripper assembly comprising:
    at least one moveable gripper jaw;
    a sensor member coupled for movement with the at least one moveable gripper jaw; and
    a fixedly positioned sensor having at least one inductor coil for inductively detecting a proximity of the sensor member, wherein the sensor comprises a first circuit board and a second circuit board mechanically coupled with the first circuit board, wherein the first circuit board of the sensor includes slots, the second circuit board of the sensor includes tabs, and the tabs of the second circuit board of the sensor are disposed within the slots of the first circuit board of the sensor to mechanically couple the first circuit board of the sensor to the second circuit board of the sensor.

\* \* \* \* \*